United States Patent [19]

Caine

[11] Patent Number: 4,808,968
[45] Date of Patent: Feb. 28, 1989

[54] AUTOMOTIVE WARNING AND BRAKE LIGHT ARRANGEMENT

[76] Inventor: Harold A. Caine, 484 Kent Ct., Oceanside, N.Y. 11572

[21] Appl. No.: 113,544

[22] Filed: Oct. 26, 1987

[51] Int. Cl.$^4$ ............................................. B60Q 1/26
[52] U.S. Cl. ...................................... 340/71; 340/69; 362/61
[58] Field of Search ................... 340/52 R, 71, 72, 74, 340/76, 81 R, 69, 66; 309/101 S; 362/61

[56] References Cited

U.S. PATENT DOCUMENTS

| 3,109,158 | 10/1963 | Coombs | 340/66 |
| 4,271,408 | 6/1981 | Teshima | 340/815.17 X |
| 4,631,516 | 12/1986 | Clinker | 340/76 |

FOREIGN PATENT DOCUMENTS

| 2056212 | 5/1972 | Fed. Rep. of Germany | 340/71 |
| 3119386 | 12/1982 | Fed. Rep. of Germany | 340/71 |
| 8701342 | 3/1987 | PCT Int'l Appl. | 340/66 |
| 1421262 | 1/1976 | United Kingdom | 340/71 |

Primary Examiner—Joseph A. Orsino
Assistant Examiner—Jeffery A. Hofsass
Attorney, Agent, or Firm—Helfgott & Karas

[57] ABSTRACT

An automotive warning and brake light arrangement includes a first lamp adapted to be mounted in the vicinity of a rear vehicle window, for emitting red light to alert a driver of a following vehicle that the leading vehicle's brakes are being applied. A second lamp in close proximity to the first lamp emits amber/yellow light to increase the visual consciousness and to warn the following vehicle driver of the presence of the leading vehicle and to improve the driver's awareness to the region of the leading vehicle's rear window at which the first lamp is located. A switching device associated with the ignition and braking systems of the leading vehicle energizes the first lamp only when the brakes are activated, and energizes the second lamp continuously when the brakes are released and the ignition system is ON.

19 Claims, 3 Drawing Sheets

A — CENTER HIGH MOUNTED BRAKE INCANDESCENT LIGHT ONLY

B — CENTER HIGH MOUNTED BRAKE INCANDESCENT LIGHT WITH INCANDESCENT YELLOW RUNNING LIGHT

AUTOMOTIVE WARNING AND BRAKE LIGHT ARRANGEMENT

BACKGROUND OF THE INVENTION

1. Field of the Invention

The present invention relates generally to automotive vehicle light signaling systems, and more particularly to an arrangement in which an amber/yellow warning lamp associated with a center-mounted red brake lamp is energized continuously, except when the vehicle brakes are activated at which time the amber/yellow lamp is extinguished and the brake lamp is energized.

2. Description of the Known Art

Rear signal light warning systems employing a combination of red, amber and green lamps are known from U.S. Pat. Nos. 2,760,113 (Aug. 21, 1985) and 3,676,844 (July 11, 1972). The '113 patent disclosed a signal light housing suspended near the rear window of a vehicle and containing individual red, amber and green signal lights. The red light is wired to be energized simultaneously with the standard stop lights of the vehicle, i.e., when a brake operated stop light switch is closed. During acceleration of the vehicle, the green light is illuminated to signal a driver of a following vehicle accordingly. Only when the driver of a leading vehicle removes his or her foot from the accelerator without application of the brakes (i.e., the vehicle is coasting) the amber signal light is illuminated. The '844 patent shows, in FIG. 2b, an arrangement of red, green, and amber signal lights extending horizontally below the rear deck of a vehicle. As in the arrangement of the '113 patent, the amber lights are energized in a coasting condition, and a central green light is illuminated when the vehicle is accelerating.

U.S. Pat. No. 4,600,913 issued July 15, 1986 to the present inventor disclosed a collision avoidance device including a single housing mounted centrally on the rear of a leading vehicle and containing a brake light and a safe distance signal light. Operation of the safe distance signal light is, however, independent of energization of the brake light. The intensity of the signal light can be varied in accordance with the ambient light by way of a photoelectric device.

According to U.S. Department of Transportation statistics, rear-end collisions accounted for about 30% of automobile accidents in the United States in 1986. The severity of this problem resulted in the mandating of the installation of high-mounted brake lights on all 1986 model automobiles in the United States.

Reduction in the number of rear-end automobile collisions can be obtained only through means of insuring that drivers maintain safer headways. That is, a driver of a following vehicle must maintain a sufficient distance between his car and a car directly in front such that he can safely stop his vehicle after a panic stop by the leading driver. Thus, the intervening distance must be maintained sufficient for the following driver to have time to (1) perceive, (2) respond, and (3) decelerate, regardless of the leading vehicle's rate of deceleration and without colliding with the vehicle.

The effectiveness of the center high-mounted brake light lies in its placement in the following driver's field of view. Dual brake lights mounted at the same height but to either side of the central visual field were found in tests to be less effective. Thus, a centrally mounted lamp facilitates perception of the brake light and reduces response time. Controlled studies with instrumented vehicles have shown that the center high-mounted brake light reduces the time between leading vehicle brake light onset and following vehicle brake application, by approximately 25%.

The center, high-mounted brake light begins to serve as an accident countermeasure when one vehicle trails another so closely that a difference in response time of 25%, that is between 0.3 and 0.4 seconds is sufficient to have a significant effect on the probability of avoiding a collision. Further reductions in rear-end collisions may be achieved if vehicle spacing is increased by an amount sufficient so that there is ample time to respond to braking by the leading vehicle, and response time of the driver of the following vehicle does not become a critical factor. An early attempt to enhance the rearward conspicuity of automotive vehicles so as to promote increased spacing, has been the use of tail lights. Of course, conventional tail lights are illuminated continuously only during night time driving and, until now, the use of easily perceived rear lighting to enhance daytime conspicuity of vehicles from the rear, as a running light has not been studied systematically.

SUMMARY OF THE INVENTION

An object of the invention is to provide a vehicle rear warning and brake light arrangement which operates effectively both in daylight and at night.

Another object of the invention is to provide a vehicle warning and brake light arrangement effective to produce quicker response time by the driver of a following vehicle to the braking a leading vehicle directly ahead.

A further object of the invention is to provide a warning and brake light arrangement fully compatible with the now-mandated centrally located high-mounted brake light.

The various features of the present invention are pointed out with particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

DETAILED DESCRIPTION OF THE INVENTION

Figure 1:
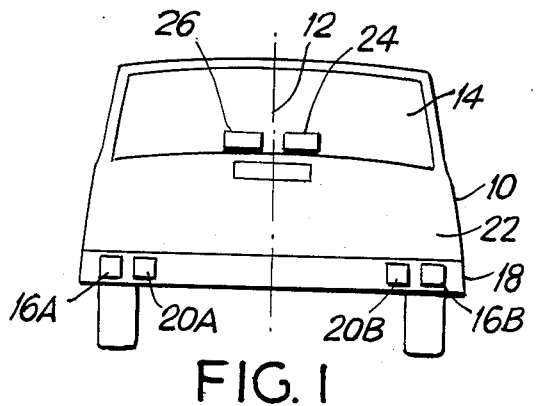
FIG. 1 is an elevational view of the rear end of a vehicle, showing one embodiment of a warning and brake light arrangement according to the invention.

FIG. 1 is a rear end view of a vehicle 10 in which a warning and brake light arrangement 12 is installed closely behind a rear window 14 of the vehicle 10. Conventional brake/or stop lights 16a, 16b are also arranged at the outer ends of a rear bumper 18. The brake/or stop lights 16a, 16b may be comprised of conventional double-filament lamps so as to provide tail lighting (red) of the vehicle 10 when driving during dark hours. A pair of conventional turn signal lights 20a, 20b are disposed inwardly of and closely adjacent the brake/or stop lights 16a, 16b.

It will be appreciated that the warning and brake light arrangement 12 will be located centrally in the field of view of the driver of a following vehicle, the arrangement 12 being just above the rear deck 22 of the vehicle 10. The present warning/brake light arrangement 12 may be disposed exteriorly of the rear window 14 provided, of course, suitable weather-proofing measures are taken in its construction.

The warning/brake light arrangement 12 in FIG. 1 includes a conventional high mounted center brake light 24. The light 24 emits red light of sufficient intensity to alert a driver of a following vehicle of the application of the brakes on the leading vehicle 10.

The light arrangement 12 also includes an amber/yellow lamp 26 adapted to be mounted in close proximity to the standard brake lamp 24, but serves to emit amber or yellow light to warn the driver of the following vehicle of the presence of the leading vehicle 10 and, importantly, to focus the attention of the driver in the amber region of the rear window 14 at which the brake lamp 24 is located.

Figure 2:
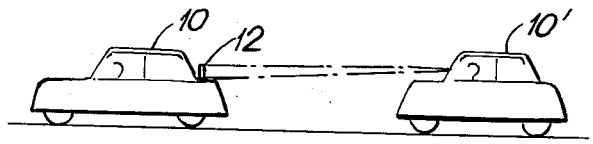
FIG. 2 is a schematic view showing a following vehicle preceiving the warning and brake light of the leading vehicle.

As shown in FIG. 2, the driver of the following vehicle 10' can view the combination light arrangement 12 on the back of the leading vehicle 10.

Figure 8:
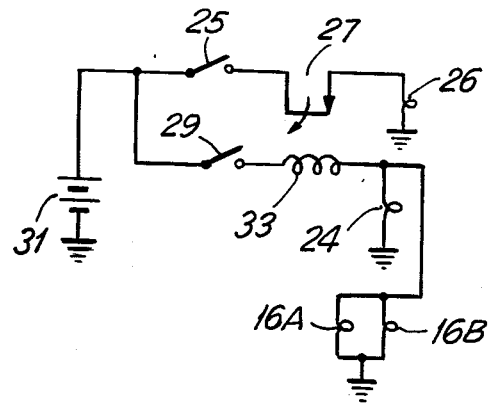
FIG. 8 is a schematic diagram of a switching circuit.

A switching circuit such as shown in FIG. 8 is provided so that the brake lamp 24 is energized only when the brakes of the vehicle 10 are activated, and the amber/yellow lamp 26 is energized continuously when the brakes are not activated and the vehicle ignition system is in an ON state. Thus the amber/yellow lamp 26 serves as a running lamp.

As seen in FIG. 8 when the vehicle ignition switch 25 is closed and a brake lamp switch 27 associated with the vehicle brake pedal 29 is in a non-actuated (closed) state, the vehicle battery 31 supplies current to the amber/yellow lamp 26. The current supply to the amber/yellow lamp 26 remains uninterrupted as long as the brake lamp switch 27 remains non-actuated, and is independent of the condition of the vehicle accelerator. Thus, even during vehicle acceleration, the amber/yellow lamp 26 continuously emits an amber/yellow light to attract the attention of a driver in a following vehicle to the region where the brake lamp 24 is located. When the brake pedal 29 is actuated, the switch 27 is disconnected by electromagnet 33 to disconnect the amber/yellow light 26 while the brake lights 16A and 16B and the center high mounted brake lamp 24 is turned on.

Figure 6:
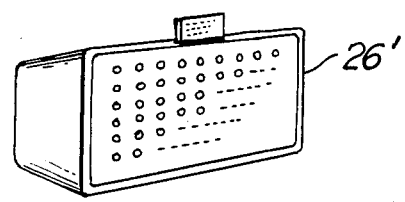
FIG. 6 is a perspective view of a lamp housing with an associated photosensor device.
Figure 9:
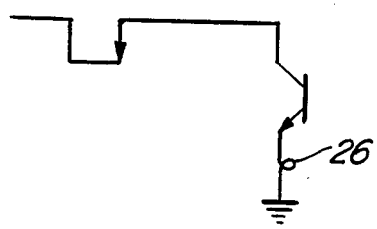
FIG. 9 is a schematic diagram of a modification of the switching circuit of FIG. 8.

As indicated in FIGS. 6 and 9, a photosensor may be coupled in series with the amber/yellow lamp 26 for controlling the intensity of the emitted amber/yellow light in corresponding relation to a level of ambient light. Accordingly, the intensity of the amber/yellow light may always be just sufficient for comfortable observation by the driver of the following vehicle at various levels of the ambient light. For example, at bright daylight conditions, the amber/yellow lamp 26 may provide full intensity. During overcast or cloudy condition, a reduced intensity may be established and, at nighttime, only a yet lower intensity. Thus there will be diminished intensity relative to the ambient light. It will be understood that if the amber/yellow lamp 26 were to provide full intensity during night time driving, glare could occur resulting in discomfort which would cause the driver of a following vehicle to divert his or her eyes from the location of the lamps 26, 24, and possibly even avoid focusing at that point.

As seen by the circuit in FIG. 8, when the brakes of the vehicle 10 are applied and the brake lamp is actuated current is supplied through the relay coil to the high mounted brake lamp 24 and the conventional bumper-mounted brake lights 16a, 16b. The current through the relay coil causes the relay switch to open and turn off the amber/yellow lamp 26. When the brakes are released and the brake lamp turned off, the brake lamp 24 and stop lights 16a, 16b, extinguish, and the amber/yellow lamp 26 is again illuminated. It will, of course, be understood that the relay depicted in FIG. 8 can be realized through electronic, rather than mechanical/or magnetic means and, in fact, a nearly instantaneous switching action is desired for the relay when using the embodiments of FIGS. 3 and 4, below.

A high mounted brake or stop lamp comprised of light emitting diodes (LEDs) has been developed and reported in the SAE Technical Paper Series No. 870061 (February 1987). The stop lamp emits red light from an array of 96GaAlAs red LEDs. As compared to the conventional incandescent high mounted brake lamp, the LED lamp consumes one-third the power and has a lifetime more than 10 times greater. Importantly, the response speed of the LED lamp is substantially greater. For example, the conventional incandescent lamp has a rise time of about 140 milliseconds. The rise time for the LED lamp measured 60 nanoseconds. The decay time of the conventional lamp was 120 milliseconds, whereas the decay time of the LED lamp was only 40 nanoseconds.

The faster rise time for the LED lamps suggests a corresponding improvement in response time for the driver of a vehicle following a leading vehicle whose brakes are suddenly applied. Evaluation tests of the newly developed LED high-mounted stop lamp are reported in the SAE Technical Paper Series No. 870065 (February 1987). Results of the investigation provided evidence that the LED lamp did in fact have a significant advantage over the conventional Tungsten-bulb stop lamp in terms of response time of following drivers. Under optimum light conditions, the LED units provided a response time advantage of about 0.2 second. Under less favorable conditions, such as viewing at a distance, the reaction time advantage increased to about 0.3 second.

With respect to the embodiment of FIG. 1, tests were performed using a conventional, tungsten-bulb high mounted center brake lamp 24, and a tungsten-bulb amber lens combination for the amber/yellow lamp 26. An important feature of the present invention resides in that whatever advantages are realized, in earlier perception resulting in improved braking response time through the use of a high mounted center red brake lamp comprised of either tungsten-bulbs, or LEDs, the provision of the amber/yellow lamp 26 which continuously emits an amber/yellow light until application of the vehicle brakes and illumination of the brake lamp 24, will further improve the braking response time as well as earlier vehicle stopping time realized with the high mounted brake lamp 24 alone.

Figure 7A:
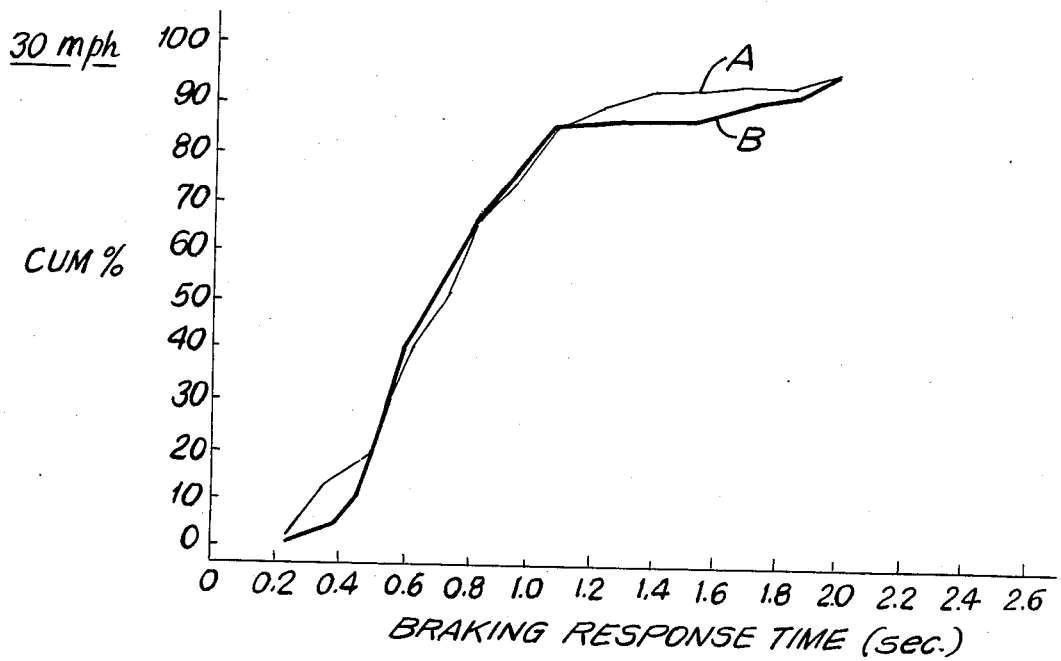
FIG. 7A is a graph showing comparative results on braking response between a center high mounted brake light and a combination center high mounted brake light and yellow/amber daytime running light when the leading vehicle travels at 30 mph.
Figure 7B:
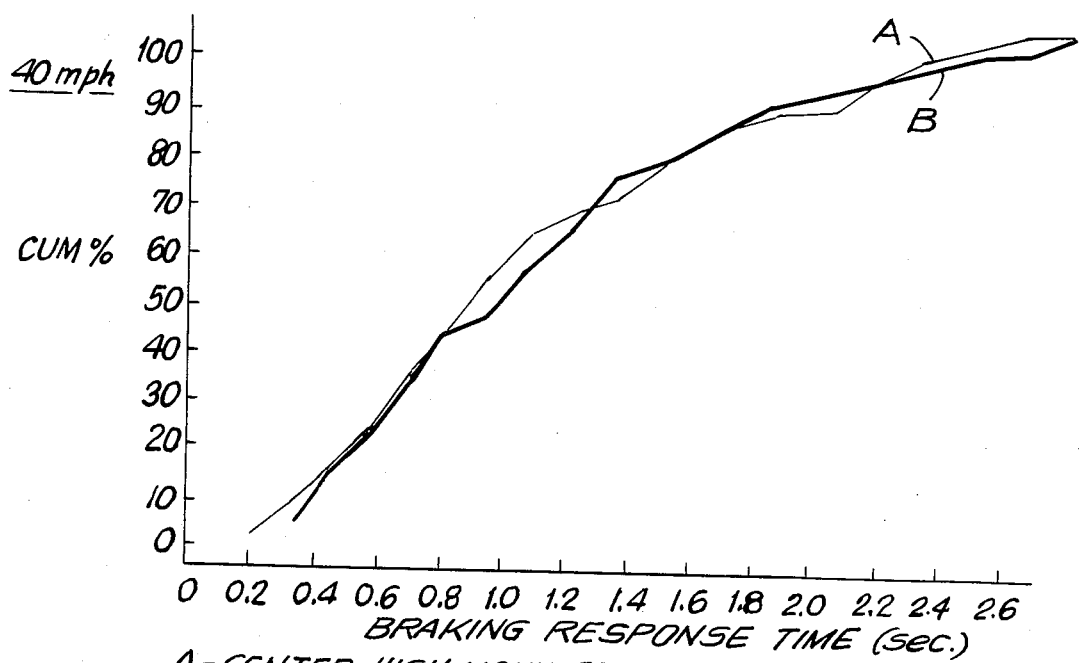
FIG. 7B is a graph showing comparative results on braking response time between a center high mounted brake light and a combination center high mounted brake light and yellow/amber daytime running light when the leading vehicle travels at 40 mph.

Tests conducted both with and without the amber/yellow lamp 26 revealed that there was a faster response which caused a decrease of between 0.2 to 0.3 second in response time and braking time with the present arrangement of the first and second lamps 24, 26 as compared to the center high mounted brake lamp 24 alone. As shown in FIG. 7A, and 7B, consistent differences in response time were found in two separate samples of observations representing speeds of 30 mph, and 40 mph. The differences were greatest near the middle of the range of response times, with the difference between medians of about 0.3 second. The mean difference between the two signal conditions, averaged over the entire range of braking response times, was about 0.2 second with adjustments made for differences in following distance. Again, the estimated reduction of 0.2 second in response time when using the present arrrangement of lamps 24, 26 is cumulative with the reduction achieved by a conventional high mounted brake lamp alone.

Figure 3:
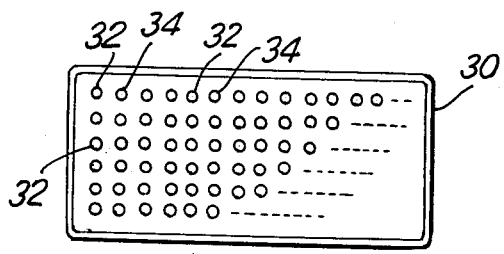
FIG. 3 is a view of the face of a warning and brake light lamp housing according to a second embodiment of the invention using red and yellow/amber LEDs which can be arranged horizontally, vertically or diagonally.

FIG. 3 shows a second embodiment of the present warning/brake light arrangement using a single lamp housing 30. The housing 30 thus would be mounted centrally behind the rear window 14 of the vehicle 10 in FIG. 1, in place of the separate lamps 24, 26. Thus either a single housing or a dual housing can be used.

First light emitting means in the form of, for example, an array of individual red LEDs 32 are mounted in a common plane. Second light emitting means in the form of an array of individual amber/yellow LEDs 34 are each interposed in alternating relation with individual ones of the red LEDs 32. A clear lens (not shown) may be provided over the face of the planar array of red 32 and amber/yellow 34 LEDs. Such lens may be used for proper diffusion to give a uniform light effect. Alternately, a red lens and an amber/yellow lens could be used respectively over the red and amber/yellow lights. All of the red LEDs 32 are connected to be energized when the brake lamp switch in FIG. 8 is actuated, i.e., closed. The amber/yellow LEDs 34 are all connected to be energized when the ignition switch is closed and the relay switch in FIG. 8 is also closed, i.e., the brake lamp switch is open.

Figure 4:
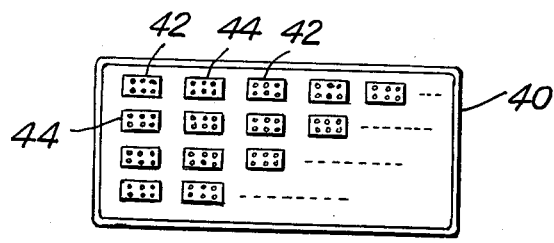
FIG. 4 is a view of the face of a warning and brake light lamp housing according to a third embodiment of the invention where the LEDs are grouped together.

A third embodiment of the present warning/brake light arrangement is shown in FIG. 4. A single lamp housing 40 contains a planar array of clusters 42 of red LEDs alternating with clusters 44 of amber/yellow LEDs. Each cluster 44 of amber/yellow LEDs is interposed in alternating relation with individual clusters 42 of red LEDs. As in the embodiment of FIG. 3, all the red LEDs are energized together when the brake lamp switch is closed, and all the amber/yellow LEDs are otherwise continuously energized. Also, a suitable lens (not shown) can be provided over the LED clusters 42, 44 for proper diffusion. It should be appreciated that other arrangements could be used such as parallel angles lines or random spacing of the LEDs.

Figure 5:
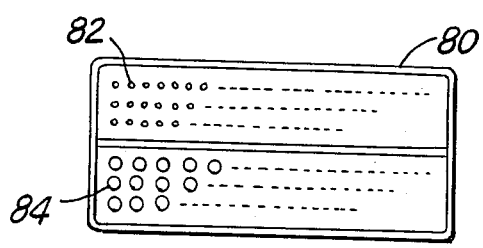
FIG. 5 is a view of another embodiment showing the combination of red LEDs and yellow/amber incandescent lamp or lamps.

FIG. 5 shows yet a further embodiment including both a combination of LEDs and incandescent lights. In this specific example, there is shown an outer housing 80 having an upper portion with red LEDs 82 and a lower portion having yellow incandescent lamps 84. It will be appreciated that other arrangements of such combination could be achieved. However, it should be appreciated that the greatest improvement in response time occurs with the use of the red as the LEDs since these are the ones that will burn on immediately providing the improved response time and braking action.

Figure 11:
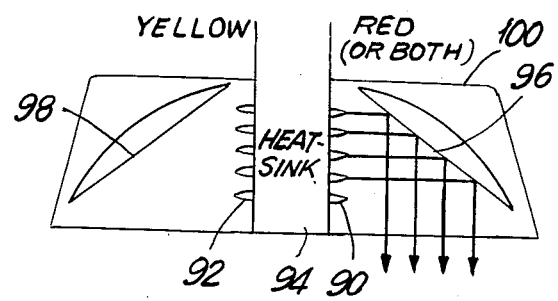
FIG. 11 shows another embodiment using reflectors to reduce the number LEDs being used.

As shown in FIG. 11, an arrangement could be achieved wherein the red and/or yellow/amber LEDs 90, 92 are arranged on either side of a heat sink 94. Reflectors 96, 98 are utilized within the outer housing 100 including a lens whereby there is a greater uniformity of light output for a reduced number of actual LED lights. Other types of arrangements could be used for different angles of the LEDs and different angles of the reflectors and lenses to achieve the best results.

Figure 10:
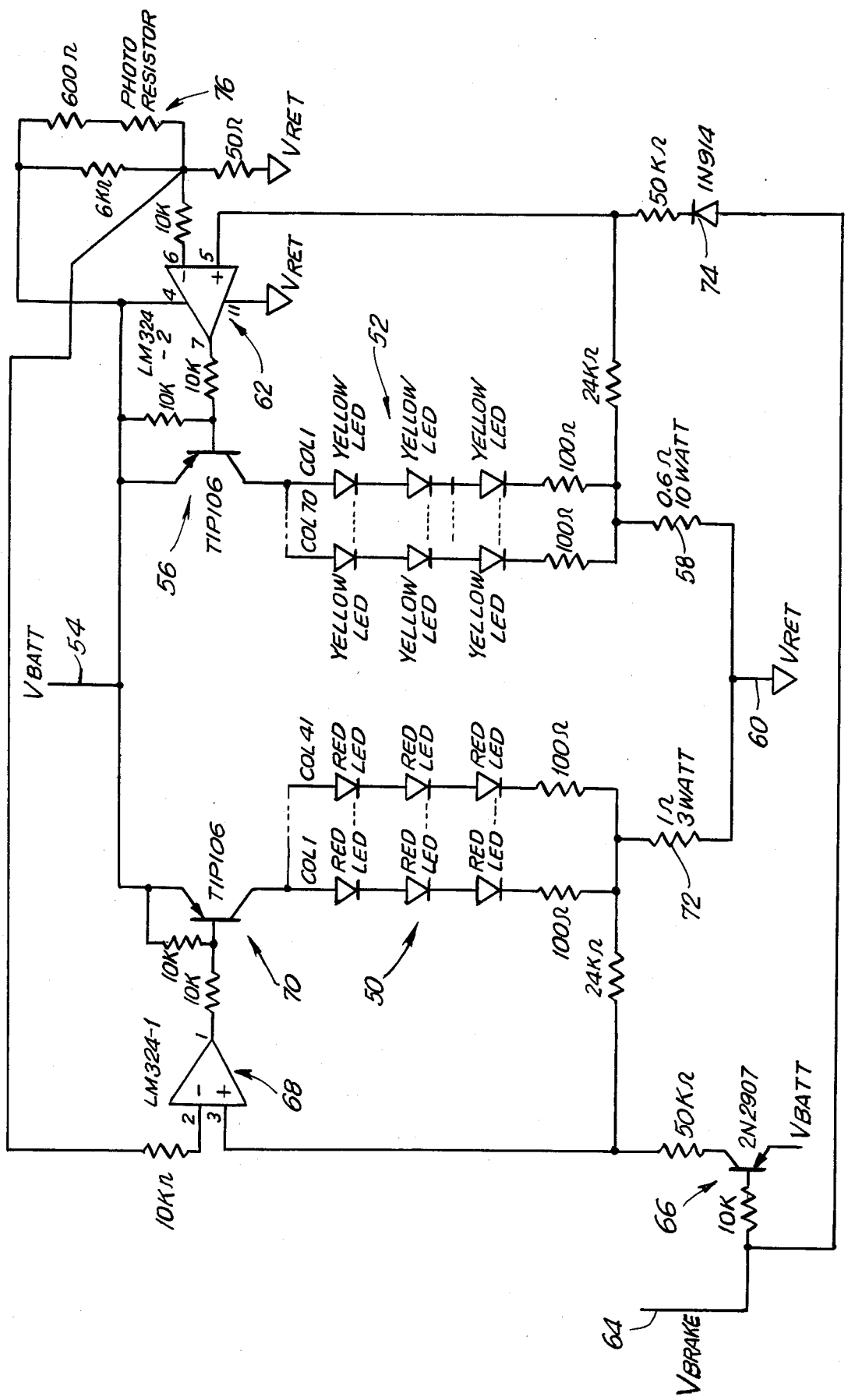
FIG. 10 is a detailed schematic diagram of a switching circuit for both red and yellow LEDs.

FIG. 10 shows a detailed circuit arrangement for controlling the center high-mounted brake light and the amber/yellow warning light as heretofore described. The lights themselves are shown as comprising parallel columns of red LEDs 50 and columns of amber/yellow LEDs. Normally, the voltage from the battery along line 54 will serve to energize the amber/yellow LEDs flowing through the transistor switch 56, through the parallel columns of amber/yellow LEDs through the resistor 58, and to the voltage return 60. The transistor switch 56 is kept open through the operation of the differential amplifier 62.

When the brake is depressed, a voltage signal from the brake pedal switch on line 64 turns on the transistor switch 66 permitting the battery voltage to operate the differential amplifier 68 producing an output signal which turns on the transistor switch 70. As a result, the voltage from the battery 54 can now flow through the switch 70 and illuminate the red LEDs, through the resistor 72 and back to the return voltage.

At the same time, the brake voltage on line 64 will pass through the diode 74 so as to turn off the differential amplifier 62. Accordingly, upon application of the brake, the red lights are turned on and the amber/yellow lights are turned off. Removal of the foot from the brake, turns off the transistor switch 66 thereby extinguishing the red lights and turning back on the amber/yellow lights.

A photoresistive device 76 receives an indication of the ambient light and produces an output which feeds both the differential amplifiers 62 and 68. In this way, the intensity of both the red lights and the amber/yellow lights can be controlled in accordance with the amount of ambient light. Alternatively, it is possible to use the photoresistor for the amber/yellow light alone, as heretofore described.

Although the circuitry shown in FIG. 10 was for both red and amber/yellow LEDs, it should be appreciated that a similar circuit could be arranged where there was a combination of LEDs and incandescents, as for example, using red LEDs and yellow incandescents. The yellow LEDs shown in FIG. 10 would be replaced by incandescents and appropriate changes in the values of the transistors and resistors, etc. would be made to properly turn on the incandescent bulbs.

While specific embodiments of the invention have been shown and described in detail to illustrate the application of the inventive principals, it will be understood that the invention may be embodied otherwise without departing from such principals.

I claim:

1. A combination warning and brake light arrangement for an automotive vehicle, comprising:
   a first lamp adapted to be mounted substantially centrally of a leading vehicle rear end in the vicinity of a rear window, for emitting red light of sufficient intensity to alert a driver of a following vehicle of the application of the leading vehicle's brakes;
   a second lamp adapted to be mounted in close proximity to said first lamp, for emitting amber/yellow light to warn the driver of the following vehicle of the presence of the leading vehicle and to focus the attention of said driver in the region of said rear window at which said first lamp is located; and
   switching means arranged with an ignition system and a braking system of the leading vehicle and coupled to said first and said second lamps, for energizing said first lamp only when the brakes of the leading vehicle are activated and for energizing said second lamp continuously when said brakes are not activated and said ignition system is in an ON state.

2. The warning and brake light arrangement of claim 1, including photosensor means associated with said second lamp for controlling the intensity of the emitted amber/yellow light in corresponding relation to a level of ambient light so that the intensity of said amber/yellow light is just sufficient for comfortable observation by the driver of the following vehicle at various levels of said ambient light.

3. The warning and brake light arrangement of claim 1, wherein each of said first and said second lamps comprises an array of light-emitting diodes (LEDs).

4. The warning and brake light arrangement of claim 1, wherein each of said first and second lamps comprise incandescent bulbs.

5. The warning and brake light arrangement of claim 1, wherein said first lamp comprises a series of red light emitting diodes (LEDs) and the second lamp comprises a series of amber/yellow incandescent bulbs.

6. The warning and brake light arrangement of claim 3, wherein the turn on response time of said first lamp is at most about 60 nanoseconds.

7. The warning and brake light arrangement of claim 4, wherein the turn off response time of said second lamp is at most about 40 nanoseconds.

8. A combination warning and brake light arrangement for an automotive vehicle, comprising:
   a lamp housing adapted to be mounted substantially centrally of a leading vehicle rear end in the vicinity of a rear window;
   first light emitting means mounted in said housing for emitting red light of sufficient intensity to alert a driver of a following vehicle of the application of the leading vehicle's brakes;
   second light emitting means mounted in said housing for emitting amber/yellow light to warn the driver of the following vehicle of the presence of the leading vehicle and to improve the awareness of said driver in the region of said rear window at which said lamp housing is located; and
   switching means associated with an ignition system and a braking system of the leading vehicle and coupled to said first and said second light emitting means, for energizing said first light emitting means only when the brakes of the leading vehicle are activated and for energizing said second light emitting means continuously when said brakes are not activated and said ignition system is in an ON state.

9. The warning and brake light arrangement of claim 8, including photosensor means associated with said second light emitting means for controlling the intensity of the emitted amber/yellow light in corresponding relation to a level of ambient light so that the intensity of said amber/yellow light is just sufficient for comfortable observation by the driver of the following vehicle at various levels of said ambient light.

10. The warning and brake light arrangement of claim 8, wherein each of said first and said second light emitting means comprises an array of light-emitting diodes (LEDs).

11. The warning and brake light arrangement of claim 8, wherein each of said first and second light emitting means comprise incandescent bulbs.

12. The warning and brake light arrangement of claim 8, wherein said first lamp comprises a series of red light emitting diodes (LEDs) and the second lamp comprises a series of amber/yellow incandescent bulbs.

13. The warning and brake light arrangement of claim 10, wherein the turn-on response time of said first light emitting means is at most about 60 nanoseconds.

14. The warning and brake light arrangement of claim 13, wherein the turn-off response time of said second light emitting means is at most about 40 nanoseconds.

15. The warning and brake light arrangement of claim 8, wherein said first light emitting means comprises an array of individual first LEDs and said light emitting means comprises an array of individual second LEDs, each interposed in alternating relation with individual ones of said first LEDs.

16. The warning and brake light arrangement of claim 8, wherein said first light emitting means comprises an array of clusters of first LEDs and said second light emitting means comprises an array of clusters of second LEDs wherein each cluster of second LEDs is interposed in alternating relation with individual clusters of said first LEDs.

17. The warning and brake light arrangement of claim 8, wherein said first and second light emitting means are arranged along parallel angled lines.

18. The warning and brake light arrangement of claim 8, wherein said first and second light emitting means are arranged in random fashion.

19. The warning and brake light arrangement of claim 8, wherein said first and second light emitting means are arranged along horizontal and vertical cross lines.

* * * * *